United States Patent
Jung et al.

(10) Patent No.: US 8,100,150 B2
(45) Date of Patent: Jan. 24, 2012

(54) FLEXIBLE PIPE FOR TRANSPORTING HYDROCARBONS, WHICH INCLUDES A TUBULAR PIPE CARCASS MADE OF INTERLOCKED METAL STRIP

(75) Inventors: Patrice Joël Louis Jung, La Mailleraye sur Seine (FR); Philippe Secher, Deville les Rouen (FR)

(73) Assignee: Technip France (FR)

( * ) Notice: Subject to any disclaimer, the term of this patent is extended or adjusted under 35 U.S.C. 154(b) by 484 days.

(21) Appl. No.: 12/438,081

(22) PCT Filed: Aug. 13, 2007

(86) PCT No.: PCT/FR2007/001369
§ 371 (c)(1),
(2), (4) Date: Mar. 30, 2009

(87) PCT Pub. No.: WO2008/025893
PCT Pub. Date: Mar. 6, 2008

(65) Prior Publication Data
US 2011/0036441 A1    Feb. 17, 2011

(30) Foreign Application Priority Data
Aug. 30, 2006    (FR) ...................................... 06 07620

(51) Int. Cl.
*F16L 11/16*    (2006.01)
(52) U.S. Cl. .................... 138/136; 138/133; 138/135
(58) Field of Classification Search .................. 138/133, 138/135, 136
See application file for complete search history.

(56) References Cited

U.S. PATENT DOCUMENTS

|   |   |   |   |   |
|---|---|---|---|---|
| 330,910 | A | * | 11/1885 | Levavasseur ................. 138/136 |
| 714,429 | A | * | 11/1902 | Witzenmann ................. 138/136 |
| 846,996 | A | * | 3/1907 | Greenfield ..................... 138/131 |
| 916,890 | A | * | 3/1909 | Rubes ............................ 138/131 |
| 1,181,522 | A | * | 5/1916 | Greiner ......................... 138/136 |
| 3,311,133 | A | * | 3/1967 | Kinander ...................... 138/136 |
| 3,340,900 | A | * | 9/1967 | Spurlock ....................... 138/136 |
| 5,096,521 | A | * | 3/1992 | Schouten ...................... 156/143 |
| 6,145,546 | A | * | 11/2000 | Hardy et al. .................. 138/136 |
| 6,904,939 | B2 | * | 6/2005 | Jung et al. .................... 138/135 |

(Continued)

FOREIGN PATENT DOCUMENTS

EP    0 429 357    5/1991

(Continued)

OTHER PUBLICATIONS

International Search Report dated Jan. 2, 2008, issued in corresponding international application No. PCT/FR2007/001369.

*Primary Examiner* — James Hook
(74) *Attorney, Agent, or Firm* — Ostrolenk Faber LLP

(57) ABSTRACT

A flexible duct with a frame made by winding a S-profiled metal strip into clamped turns, wherein the edges of two adjacent turns overlap each other in order to form between them a helical closed space having an essentially rectangular cross-section and at least partially filled by a helically-wound spacer separate from the metal strip and resting on at least two opposing walls of the lower surface and the upper surface, wherein the spacer has, in the winding radial direction, a crush resistance substantially equal to zero and, in the winding longitudinal direction along the pipe, a substantial crush resistance.

21 Claims, 3 Drawing Sheets

U.S. PATENT DOCUMENTS

2004/0261878 A1 * 12/2004 Jung et al. .................. 138/135

FOREIGN PATENT DOCUMENTS

| EP | 0 527 413 A1 | 2/1993 |
|---|---|---|
| FR | 420 842 A | 8/1911 |
| FR | 465 136 A | 4/1914 |
| FR | 1 367 139 A | 7/1964 |
| WO | WO 03/036152 | 5/2003 |
| WO | WO 2004/005785 | 1/2004 |

* cited by examiner

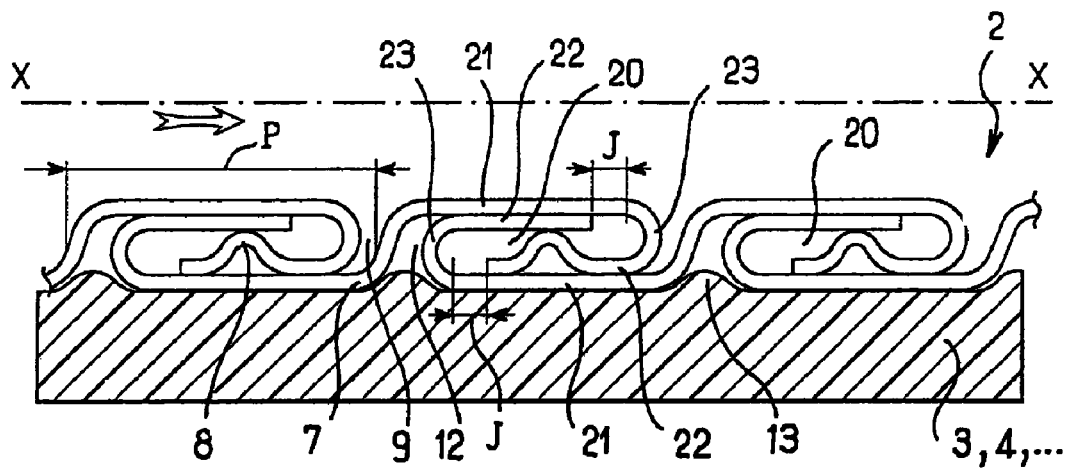
PRIOR ART FIG.2
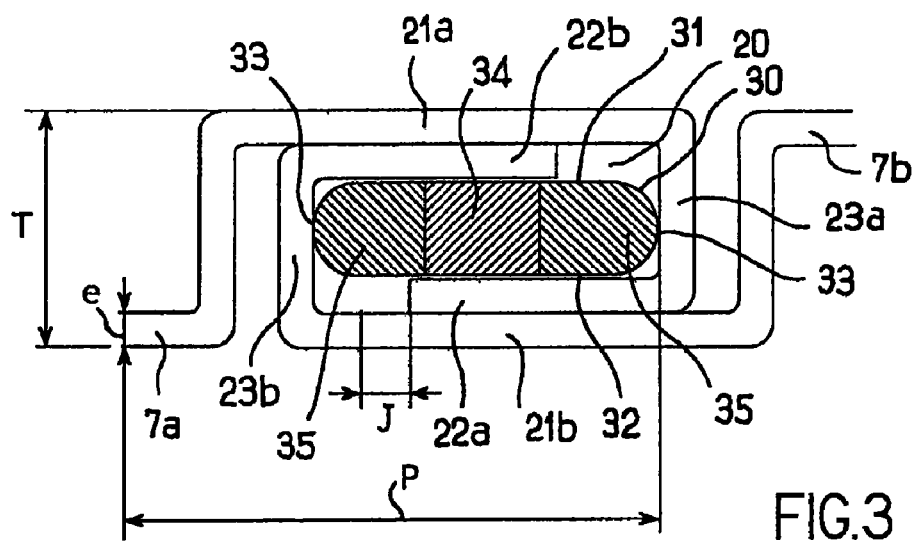
FIG.3
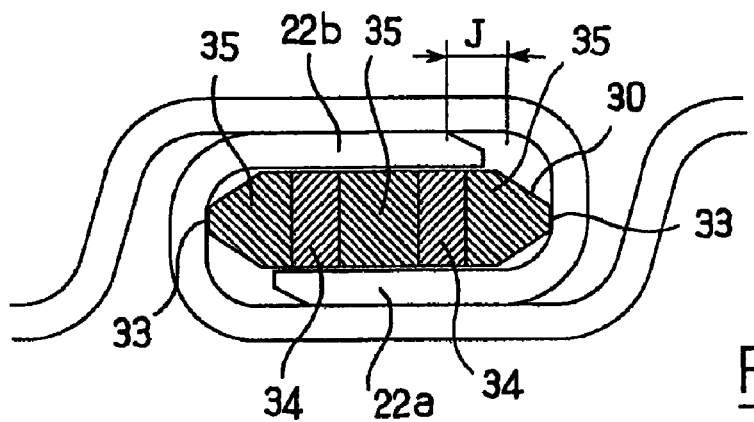
FIG.4

FLEXIBLE PIPE FOR TRANSPORTING HYDROCARBONS, WHICH INCLUDES A TUBULAR PIPE CARCASS MADE OF INTERLOCKED METAL STRIP

CROSS REFERENCE TO RELATED APPLICATION

The present application is a 35 U.S.C. §§371 national phase conversion of PCT/FR2007/001369, filed Aug. 13, 2007, which claims priority of French Application No. 0607620, filed Aug. 30, 2006, incorporated by reference herein. The PCT International Application was published in the French language.

BACKGROUND OF THE INVENTION

The present invention relates to a flexible tubular pipe for transporting hydrocarbons, of the type comprising, placed radially from the inside outward, a carcass, an internal pressure sheath and one or more armor plies, the carcass being formed by the winding, with interlocked turns, of a profiled elongate element of metal strip type.

Such a pipe is commonly called a "rough bore" pipe because the carcass which constitutes the inner layer of the pipe has obvious discontinuities at the gaps separating the turns, unlike what are called "smooth bore" pipes in which the innermost layer of the pipe is formed by an inner sheath covering the inside of the vault.

Such a pipe may optionally include, in addition to the layers mentioned, other special layers, such as a pressure vault, a hoop layer, intermediate sheaths, an external protection sheath, etc.

The carcass is, as the API 17J recommendations by the American Petroleum Institute recall, a tubular layer, in principle an inner layer, formed from an interlocked metal winding intended essentially to prevent the collapse of the internal sealing sheath or of the pipe in the absence of internal pressure in the pipe, owing to the effect of the external pressure, of the pressure generated by the tensile armor plies or even of the external mechanical loads (especially in the gripping members used for laying the pipe).

The carcass is most conventionally made of corrosion-resistant metal strip, generally shaped with a cross-section similar to a couched "S" and wound in such a way as to produce turns that interlock with one another. In order to improve the performance of a carcass, various proposals have already been made. Reference may thus be made to document EP 0 429 357 by the Applicant, which discloses a carcass in which the constituent metal strip comprises a wave forming a bearing structure that increases the height of the cross-section and therefore the inertia, thus improving the crush resistance of the carcass.

Although this solution seems simple to implement, in practice it appears that the operation of precisely forming the wave is difficult. Wave formation on the border of the metal strip requires large forces on the profiler—it turns out that the strip slips under these forces, which results in the geometry of the profiled element being unbalanced, causing problems both in the pitch and the inertia of the interlocked profiled element. These problems may reduce the crush resistance of the carcass.

The Applicant has also proposed in document WO 03/036152, for certain applications, a carcass formed by the winding of at least one elongate metal element of large cross-section which is corrosion-resistant and interlocked by a thin corrosion-resistant metal strip.

SUMMARY OF THE INVENTION

The objective of the invention is to provide a novel carcass structure for oil production pipes that does not have the abovementioned wave but nevertheless performs well, especially in terms of crush resistance.

This objective is achieved according to the invention by a flexible tubular pipe for transporting hydrocarbons, especially gaseous hydrocarbons. The pipe is of the type comprising a set of unbonded layers including, at least, from the inside outward, a carcass, an internal pressure sheath and one or more armor plies. The carcass is formed by the winding, with interlocked turns, of an S-shaped profiled metal strip. The edges of two adjacent turns overlap to form between them a helicoidal closed space of approximately rectangular cross-section bounded in the radial direction by opposed inner-fiber and outer-fiber walls formed from at least one thickness of metal strip and, in the longitudinal direction, by two opposed lateral walls formed from a thickness of metal strip. The closed space is at least partially occupied by a one-piece profiled spacer which is wound helically, is separate from the metal strip, and bears on at least the two opposed inner-fiber and outer-fiber walls The profiled spacer is almost uncrushable in the radial direction of the winding but is substantially crushable in the longitudinal direction of the winding.

Thus, the profiled spacer interacts efficiently with the metal strip so as to ensure a guaranteed spacing between the inner-fiber and outer-fiber walls of the turns, which prevent them from being crushed. However, owing to the relative flexibility of the profiled spacer in the longitudinal direction of the winding, the spacer does not absolutely prevent the turns from moving closer together, for example when the pipe is being bent, even though it does dampen this movement a little. The flexibility of the carcass (and therefore of the pipe that incorporates it) is therefore not compromised by the presence of the profiled spacer.

The fact that the spacer is a part separate from the metal strip itself simplifies the manufacture of the strip by eliminating the step of profiling the wave of the strip. The profiled spacer part may itself be relatively simple and is incorporated into the carcass during production of the latter by the spiraler.

Advantageously, the overall dimension of the profiled spacer in the radial direction is approximately equal to the spacing between the inner-fiber and outer-fiber walls of the winding, so that the spacer sets the inner-fiber and outer-fiber walls directly to their nominal spacing.

Advantageously, the overall dimension of the profiled spacer in the longitudinal direction of the winding is approximately equal to the average spacing between the lateral walls of the turns when they are wound with their average pitch. Therefore, the effect of the movement damping is felt only from a pitch smaller than the average pitch.

Advantageously, the profiled spacer includes at least one radially incompressible element forming the height of the spacer in the radial direction of the winding. This incompressible element may be continuous, in the form of one or more wound elongate elements, or discontinuous, in the form of a plurality of sections or studs. It is this radially incompressible element that makes the profiled spacer uncrushable in the radial direction of the winding. Advantageously, this incompressible element is made of metal, preferably steel, and for example a grade of steel similar to that of which the metal strip is made.

In one embodiment, the profiled spacer includes at least one polymeric element which is compressible, at least in the longitudinal direction of the winding, and is fastened to the radially incompressible element and extends essentially in the longitudinal direction of the winding relative to the radially incompressible element so as to give the profiled spacer a certain crushability in the longitudinal direction of the winding. This may be a solid polymeric element or even a polymeric matrix in which the radially incompressible element is embedded. It may also be a hollow polymeric profiled element.

In another embodiment, the radially incompressible element has a geometry suitable for giving it compressibility in the longitudinal direction of the winding. For example, it is placed so as to form undulations that have a spring function. In this case, it is unnecessary to provide an associated polymeric element.

In a preferred embodiment, the opposed inner-fiber and outer-fiber walls of the helicoidal space between the interlocked turns consist of two superposed thicknesses of metal strip over at least most of their surface.

The invention makes it possible, in particular in its version that includes a polymeric part, to better control the manufacturing pitch, in so far as the profiled spacer inserted into the space between interlocked turns is designed to be in contact with the lateral walls of the metal strip with the average pitch. Upon being bent, the material enters the voids of the space and is able to resume its place upon being unbent. The variations in pitch arising from the carcass winding and unwinding operations until it is sheathed are thus substantially reduced.

An unexpected advantage of the invention is to do with the problem of vibrations that is found on certain flexible risers intended for producing and exporting gaseous hydrocarbons. This problem is associated with the flow of gas in rough bore pipes and more specifically with the formation of vortices which occur upon contact with the gaps between the turns of the carcass. What happens is that the surface discontinuity encountered at these gaps leads to the formation of vortices (vortex shedding) which disturb the flow of the gas through the pipe. These vortices give rise to cyclic pressure variations which may lead to problems of resonance (vibration, noise) in the pipe and in the equipment and pipework on the platform or the FPSO (Floating Production Storage and Offloading) generally known as "topsides". These problems may give rise to numerous undesirable phenomena such as, for example, leaks at the equipment and pipework connected to the end fittings of the pipes, as a result of fatigue. Document WO 2004/005785 in the name of the Applicant teaches a solution to this problem that consists in providing holes in the carcass. The present invention also enables this problem to be solved: specifically, the rubbing added by the profiled spacer and the deformation of the profiled spacer increase the potential for energy dissipation and help to prevent the occurrence of noise on the riser.

Other advantages and characteristics of the invention will be brought to light upon reading the description which follows, with reference to the attached drawings in which:

BRIEF DESCRIPTION OF THE DRAWINGS

FIG. 2 is a schematic view of a longitudinal section of carcass of the prior art, produced by winding an S-shaped metal strip;

FIG. 3 is an enlarged schematic view of a longitudinal section of carcass at the point where two adjacent turns interlock, with its profiled spacer, according to a first embodiment of the invention, with a metal strip profile in the form of a square S;

FIG. 4 is view similar to FIG. 3 for a second embodiment of the profiled spacer of the invention, with a metal strip profile in the form of a rounded S;

DESCRIPTION OF PREFERRED EMBODIMENTS

Figure 1:
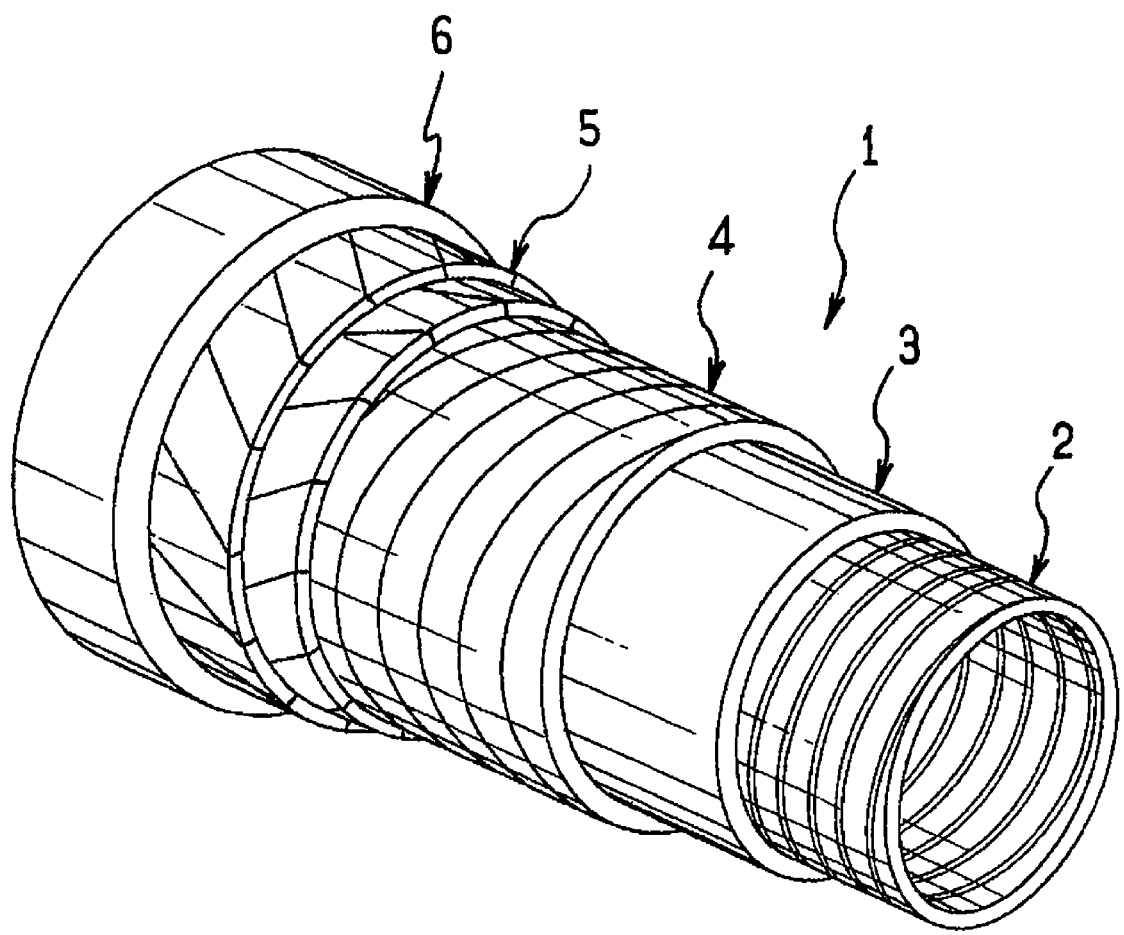
FIG. 1 is a perspective view of a pipe of the rough bore type to which the invention applies.

The flexible pipe 1 depicted in FIG. 1 comprises, from the inside outward:
 a carcass 2 consisting of an interlocked metal winding which serves to prevent the pipe from collapsing under the external pressure;
 an internal sealing pressure sheath 3, made of plastic, generally a polymer, resistant to the chemical action of the fluid to be transported;
 a pressure vault 4 that mainly resists the pressure developed by the fluid in the pressure sheath and consists of the short-pitch helical winding (that is to say with a winding angle of about 90°), about the internal sheath, of one or more interlocking metal wires (which may or may not self-interlock); the shaped wires have a cross-section in the shape of a Z or a T or any derivative (teta or zeta) thereof, of a U or of an I;
 at least one ply 5 (and generally at least two crossed plies) of tensile armor wound with a long pitch; the lay angle measured with respect to the longitudinal axis of the pipe is typically between 25° and 55°; and
 a protective external sealing sheath 6 made of a polymer.

The pressure vault 4, essentially intended to withstand the internal pressure, is not needed in all situations and, given the additional cost burden that it represents, it is preferable to use a pipe without a pressure vault wherever circumstances so permit. The invention applies equally to either scenario.

FIG. 2 shows the construction of a carcass 2 known from document EP 0 429 357, produced from the helical winding about an axis XX of a metal strip 7 shaped into a flattened S, provided with a wave-shaped bearing part 8. This figure represents the internal gaps 9 and the external gaps 12 which are plugged by the plastic layer of the sheath 3 that surrounds the carcass and creeps slightly into the gaps 12, thereby forming indentations 13. The longitudinal clearance between the turns is permitted because of the distance J left between the end of the return 22 of one turn and the junction between the branch 21 and the intermediate section 23 of the adjacent strip turn 7. This longitudinal clearance means that the pitch P between turns can vary between a minimum pitch and a maximum pitch and that a pitch called the average pitch can be defined.

Figure 9:
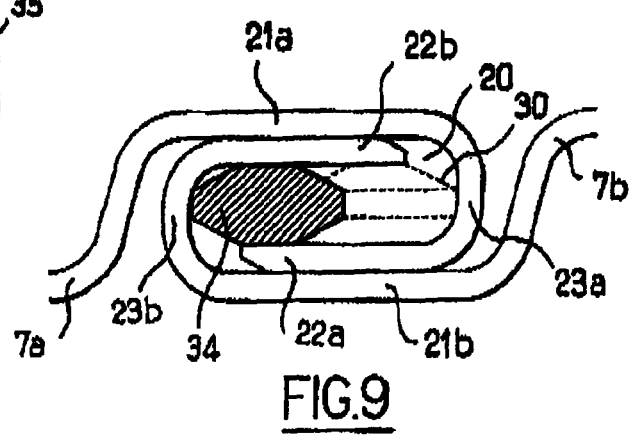
FIG. 9 is a view similar to FIGS. 3 and 4 for a seventh embodiment of the profiled spacer according to the invention.

FIG. 3 represents in more detail the interlocking of two adjacent turns 7a and 7b of the S-shaped metal strip 7, these being represented with their spacing corresponding to the average pitch. The two S shapes of the turns 7a, 7b comprise longitudinally placed branches 21a, 21b and likewise longitudinally placed returns 22a, 22b that are separated from the branches 21a, 21b by transversely arranged sections 23a, 23b. The two turns 7a, 7b fit together, defining an internal space in the form of a helicoidal well 20 bounded on the inner-fiber side of the winding by two superposed thicknesses 21a and 22b of the metal strip 7 and on the outer-fiber side by two superposed thicknesses 21b and 22a of the metal strip 7. The sections 23a, 23b form the lateral walls of this helicoidal closed space 20. It does not matter whether these lateral walls 23a, 23b have a planar geometry as shown in FIG. 3 or a rounded geometry as shown in FIGS. 4 and 9. This is because the shape of the Ss is not critical and may be approximately square as shown in FIG. 3 or rounded as shown in FIGS. 4 and 9.

The space 20 is partially occupied by a helically wound profiled spacer 30 placed so as to be approximately in permanent contact with the two radially inner 22b and outer 22a walls of the space 20 and to be preferably also in permanent contact with the two side walls 23a, 23b when they are at their average spacing. For this purpose, the cross-section of the profiled spacer 30 is therefore in relation with the cross-section of the space 20 and generally has the same height and the same width as said space. The spacer 30, in the embodiments shown in FIGS. 3 to 7, takes the form of a substantially flat windable spacer having a large inner-fiber face 31, a large outer-fiber face 32 and two small lateral faces 33, which are optionally rounded, angular or beveled.

Figure 5:
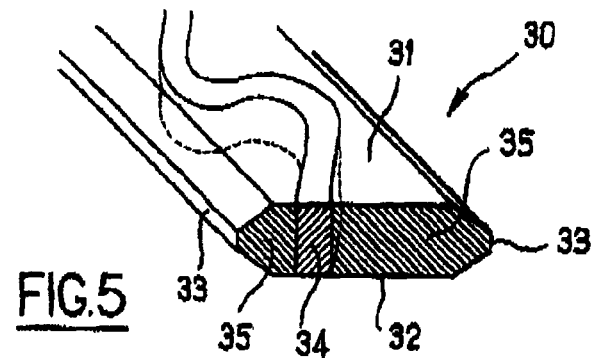
FIGS. 5, 6 and 7 are views in partial perspective of a profiled spacer according to third, fourth and fifth embodiments of the invention.
Figure 6:
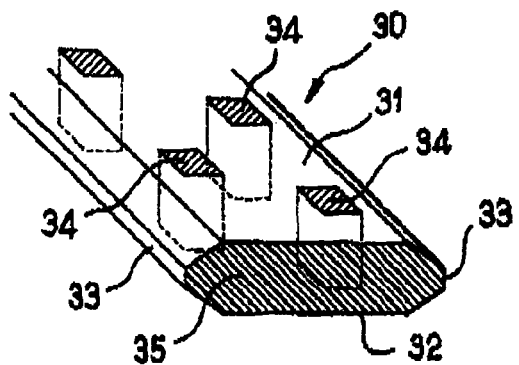
Figure 7:
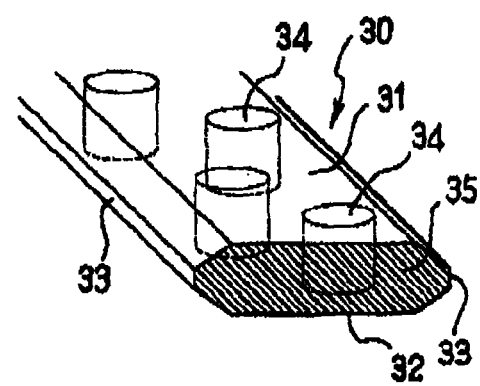

The profiled spacer 30 is designed to have, between its inner-fiber face 31 and its outer-fiber face 32 (i.e. in the direction of the spacer height over the cross-section), a high rigidity, obtained for example by the presence of at least one metal part 34 extending over the entire height of the spacer 30 but possibly extending only over a portion of its length. This metal part 34 may be continuous over the entire length of the spacer 30 (FIGS. 3, 4, 5) or discontinuous (FIGS. 6 and 7). It may form a single part (FIGS. 3 and 5) or form several separate parts, for example several continuous parallel parts (FIG. 4) or several isolated studs, preferably arranged in a staggered fashion, for example with a polygonal base (FIG. 6) or a round base (FIG. 7). The continuous part 34 may be straight, relative to the general direction of the spacer 30 (FIGS. 3 and 4), or zig-zagged within said spacer (FIG. 5). The latter arrangement has the advantage of enlarging the bearing zone of the metal part 34 while limiting the amount of steel. In all cases, the part 34 maintains a constant spacing between the inner-fiber and outer-fiber walls of the winding of turns 7a, 7b.

The profiled spacer 30 is designed to have, between its lateral faces 33 (in the width direction of the spacer over the cross-section), a certain elastic flexibility obtained for example by the presence of at least one part 35 made of a flexible elastic material forming the rest of the spacer 30. In this way, the spacer 30 may undergo a certain elastic compression between the lateral faces 33.

If the walls 23a, 23b of the two adjacent turns 7a, 7b are in contact with the lateral faces 33, they will be able, depending on the deformation of the pipe, to move closer together by deforming, between them, the elastically flexible portions of the spacer 30 in order to reduce the distance J. As shown in FIG. 4, the shape of the end of the return 22a, 22b of the turn may be beveled, thereby slightly modifying the point at which the spacing P starts.

Figure 8:
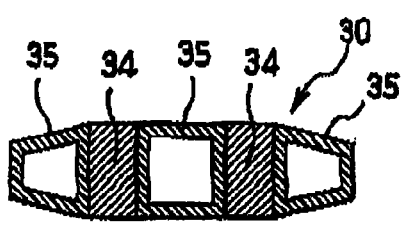
FIG. 8 is a view of the profiled spacer in cross-section in a sixth embodiment.

In FIGS. 3 to 7, the flexible part 35 is solid. As shown in FIG. 8, hollow flexible parts 35 may be provided in order to increase the flexibility of the part 35. Of course, as in the case of the other embodiments, the whole assembly remains a one-piece assembly and the spacer remains a single profiled spacer occupying the space 20 and just by itself providing the two different compressibility functions in the radial and longitudinal directions.

The polymeric parts or parts 35 are made integral with the metal part or parts 34 by adhesive bonding or by extrusion with the metal parts that have undergone a surface preparation beforehand in order to bond to the polymer. They may also be fastened using mechanical interlocking means, for example of the dovetail type.

The fastening of the polymeric parts 35 to the metal parts 34, enabling a one-piece profiled spacer to be obtained, has the effect of making it easier to manufacture the carcass. This is because, owing to the unicity and one-piece character of the spacer, the carcass can be manufactured from only two components, namely on the one hand a metal strip and on the other hand a profiled spacer. This enables the carcass according to the present invention to be manufactured by again using most of the profiling and spiraling machines used to produce the carcasses of the prior art (FIG. 2), the modifications to be made to said machines in order to produce the carcass according to the present invention remaining minor. This is because most spiraling machines are designed to wind two components simultaneously, so that they can be easily adapted for manufacturing a carcass according to the present invention, the adaptation being only on trains of guiding and profiling wheels necessary for guiding and/or profiling the components up to their point of winding. The train of wheels associated with the metal strip is a profiling train, whereas that associated with the profiled spacer is a simple guiding train.

The metal part 34 is preferably made to a similar quality to that of the steels used for the metal strip (for example a 316L steel).

The polymer of the polymeric part 35 may be chosen from a wide range of products, depending on the required performance and in particular on the compatibility with the fluids transported. Preferably, the polymer has a certain rigidity at room temperature in order to maintain the pitch of the spiraling and to survive the extrusion of the polymeric sheath 3. The polymer also preferably maintains a hysteretic behavior during the lifetime of the riser in which they are used.

The presence of the polymeric part 35 may optionally have the effect of sealing the carcass. If such sealing is not required, the metal strip may optionally be perforated, in particular near the internal gaps 9 or external gaps 12.

FIG. 9 shows an alternative embodiment in which the profiled spacer 30 is made as a single metal part 34, with a substantially beveled rectangular cross-section, arranged inside the space 20 in a zig-zag so as to touch, via the peaks of its undulations, sometimes one side wall 33 and sometimes the other. Therefore the metal part 34 constitutes by itself the profiled spacer 30 and gives it the necessary rigidity in the height direction and the flexibility in the width direction thanks to the spring effect provided by the undulations.

The figures have been shown for a profiled metal strip in which the ratio of the thickness T of the carcass to the thickness e of the strip constituting it is 7, for an average pitch P of about 17.5 times the thickness of the metal strip (the drawing is not to scale in the longitudinal direction of the winding). Of course, the profiled elements used in the invention may vary widely about these values. However, it is preferable for the ratio T/e to be between 5 and 10, and advantageously between 7 and 10, in order to allow spiraling, and the P/T ratio to be less than about 5 in order to maintain good crush resistance performance.

The invention claimed is:

1. A flexible tubular pipe for transporting hydrocarbons, the pipe comprising a set of unbonded layers including, at least, from inside the pipe outward, a carcass, an internal pressure sheath and one or more armor plies;

the carcass comprising a helicoidal winding of successive turns of an S-shaped profiled metal strip, wherein adjacent turns are interlocked, the turns of the strip having edges, the edges of two adjacent turns being shaped and positioned and being overlapping to form between them a helicoidal closed space bounded in a radial direction of the pipe by an inner-fiber wall at one of the edges of one of the adjacent turns and an opposed outer-fiber wall at an adjacent one of the edges of the other of the adjacent turns, and the space is formed from at least one thickness of the metal strip, the closed space being bounded in a longitudinal direction thereof of the winding which is along a length dimension of the pipe by two opposed lateral walls also formed from a thickness of metal strip and each being at the respective adjacent edge of a respective one of the adjacent turns a one-piece profiled spacer at least partially occupying the open space, the spacer being wound helically, being separate from the metal strip, and bearing at least on the two opposed inner-fiber and outer-fiber walls, the profiled spacer being configured and being of such materials such that the spacer is almost uncrushable in the radial direction of the winding but is substantially crushable in the longitudinal direction of the winding.

2. The pipe as claimed in claim 1, wherein an overall dimension of the profiled spacer in the radial direction is approximately equal to the radial spacing between the inner-fiber wall and the outer-fiber wall of the winding.

3. The pipe as claimed in claim 1, wherein the overall dimension of the profiled spacer in the longitudinal direction of the pipe is approximately equal to the average spacing between the lateral walls of the turns when they are wound with a respective average pitch.

4. The pipe as claimed in claim 1, wherein the profiled spacer includes at least one radially incompressible element forming a height of the spacer in the radial direction of the winding.

5. The pipe as claimed in claim 4, wherein the incompressible element is a continuous element along the length of the wound spacer.

6. The pipe as claimed in claim 5, wherein the incompressible element is in the form of a single wound elongate element.

7. The pipe as claimed in claim 5, wherein the incompressible element is in the form of several wound elongate elements.

8. The pipe as claimed in claim 4, wherein the t incompressible element is a discontinuous element along the length of the wound spacer.

9. The pipe as claimed in claim 4, wherein the incompressible element is made of metal.

10. The pipe as claimed in claim 9, wherein the strip is made of steel of a selected grade, and the incompressible element is made of a grade of steel similar to the grade of steel of the metal strip.

11. The pipe as claimed in claim 4, wherein the profiled spacer includes at least one polymeric element which is compressible, at least in the longitudinal direction of the winding, between opposite ones of the edges of a turn thereof, and the polymeric element is fastened to the radially incompressible element.

12. The pipe as claimed in claim 11, wherein the polymeric element extends essentially in the longitudinal direction of the winding relative to the radially incompressible element.

13. The pipe as claimed in claim 11, wherein the polymeric element is a solid element.

14. The pipe as claimed in claim 11, wherein the polymeric element is a polymeric matrix in which the radially incompressible element is embedded.

15. The pipe as claimed in claim 11, wherein the polymeric element is hollow.

16. The pipe as claimed in claim 4, wherein the radially incompressible element has a geometry which gives to the radially incompressible element compressibility in the longitudinal direction of the winding between the edges thereof.

17. The pipe as claimed in claim 4, wherein the radially incompressible element is placed so as to form undulations along the length of the spacer between the edges of the spacer.

18. The pipe as claimed in claim 4, wherein the profiled spacer includes at least one polymeric element which is compressible, at least in the longitudinal direction of the winding between opposite ones of the edges of a turn thereof, and the crushable polymeric element is fastened to the radially incompressible element.

19. The pipe as claimed in claim 18, wherein the crushable element extends essentially in the longitudinal direction of the winding relative to the radially incompressible element.

20. The pipe as claimed in claim 1, wherein each of the opposed inner-fiber wall and the outer-fiber wall of the helicoidal space between the interlocked turns is defined respectively by two superposed thicknesses of metal strip extending over at least most of a respective opposing surface of the spacer, wherein each of the two thicknesses is at the respective edge of the adjacent turning of the winding.

21. The pipe as claimed in claim 1, wherein the closed space is of approximately rectangular cross-section.

* * * * *